April 10, 1962 J. G. WATTS 3,028,801
BARBECUE SPIT CONSTRUCTION
Filed Nov. 6, 1958 3 Sheets-Sheet 1
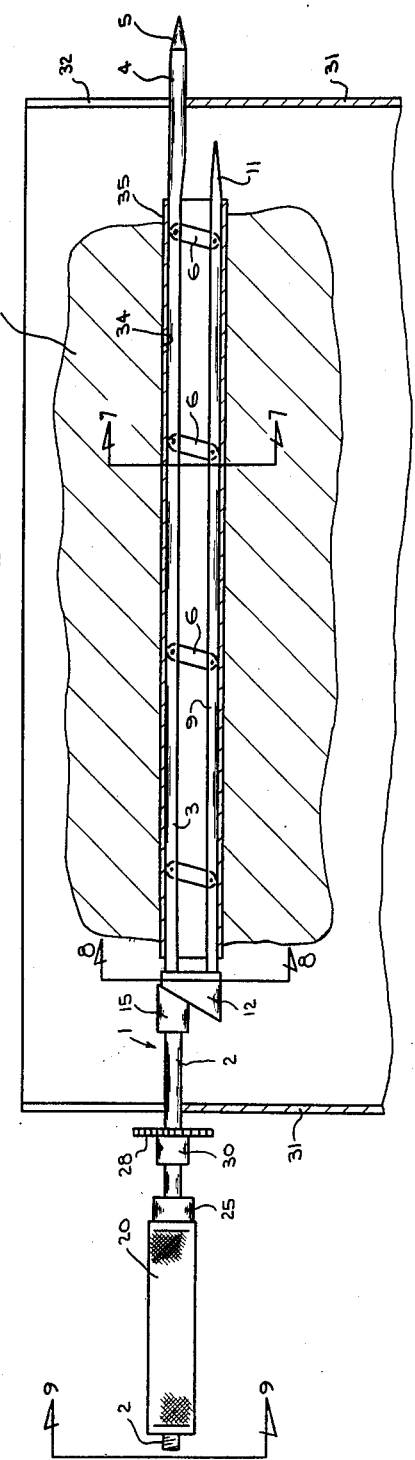
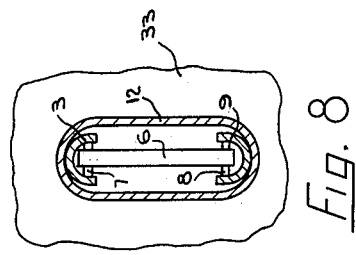
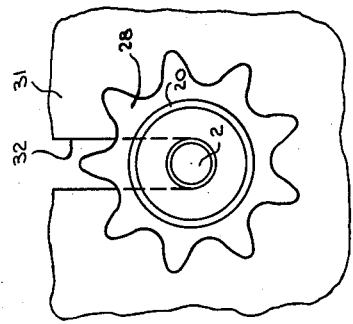
INVENTOR.
JAMES G. WATTS
BY
Learman, Learman & McCulloch

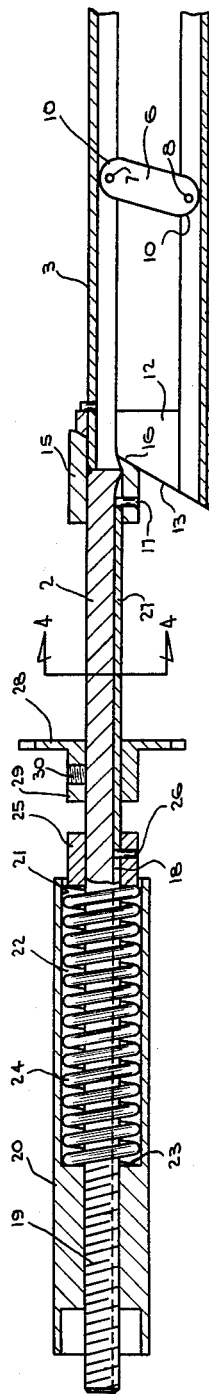
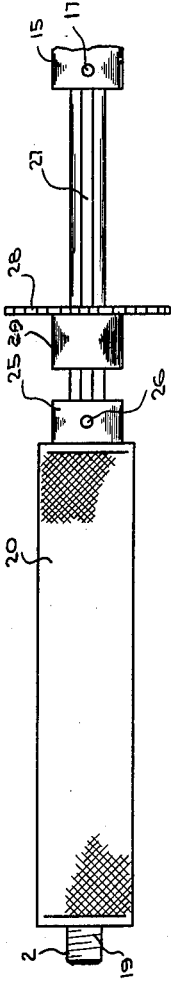
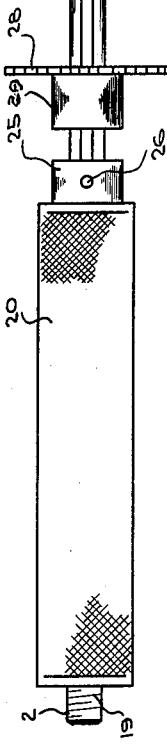
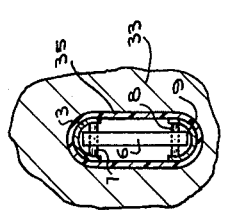
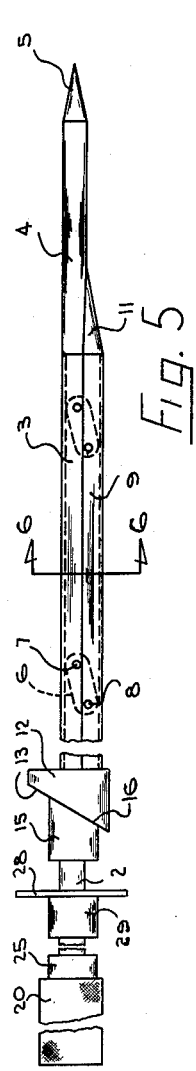
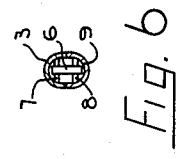
INVENTOR.
JAMES G. WATTS April 10, 1962 J. G. WATTS 3,028,801
BARBECUE SPIT CONSTRUCTION
Filed Nov. 6, 1958 3 Sheets-Sheet 3
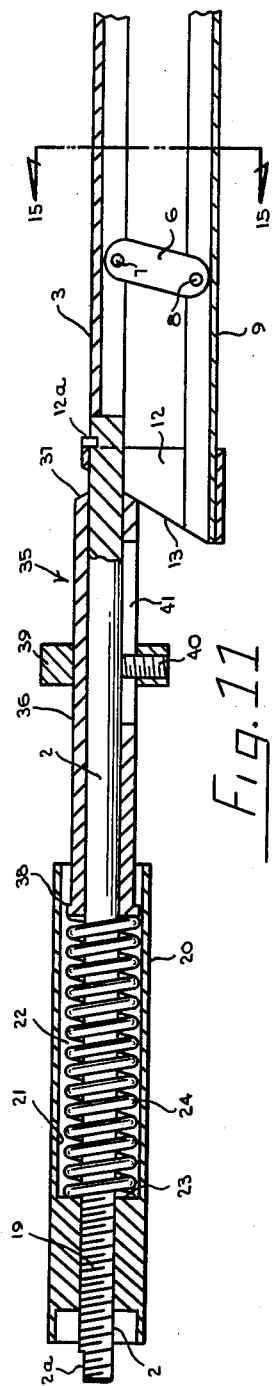
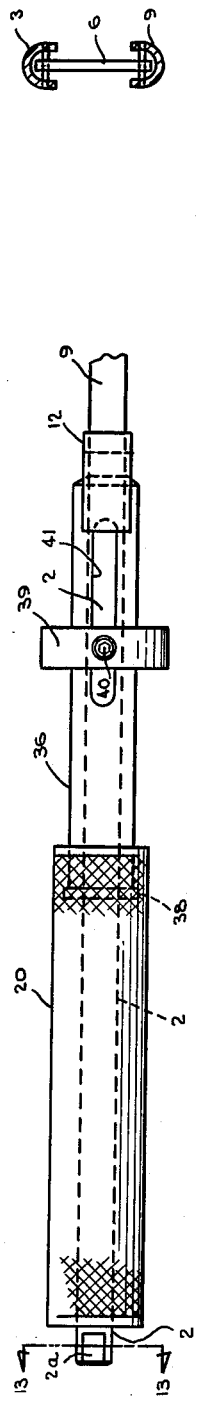
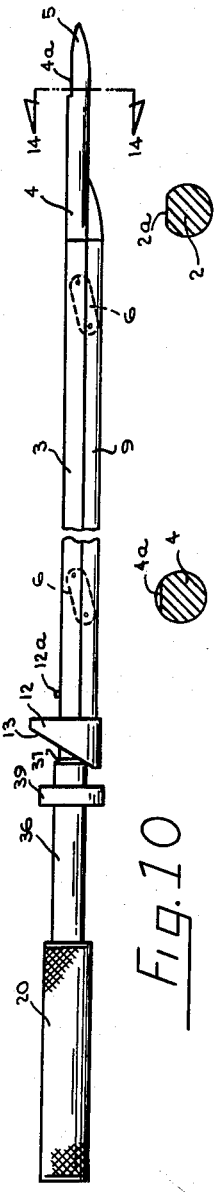
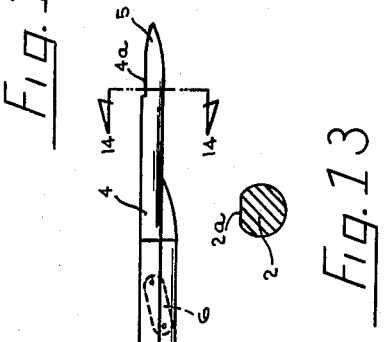
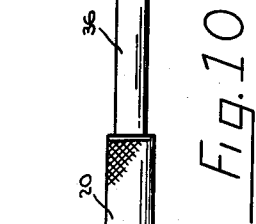
INVENTOR.
JAMES G. WATTS
BY
*Learman, Learman & McCulloch*

United States Patent Office 3,028,801
Patented Apr. 10, 1962

3,028,801
BARBECUE SPIT CONSTRUCTION
James G. Watts, Marathon, Fla., assignor of fifty percent to Bernard S. Frasik, Bay City, Mich.
Filed Nov. 6, 1958, Ser. No. 772,207
4 Claims. (Cl. 99—419)

This application is a continuation-in-part of application Serial No. 714,977, filed February 13, 1958, now abandoned.

This invention relates to spit constructions of the kind adapted for use in rotatably supporting an article of food such as a roast, fowl, spareribs, or the like adjacent to an open fire.

When an article of food of the kind referred to above is impaled on a rotatable spit for the purpose of being roasted, it is not uncommon for the food article to loosen on the spit to such an extent that the spit is capable of rotating relatively to the article. When such a situation occurs, the food article will become cooked, or possibly overcooked, on the side confronting the fire, but will not be thoroughly cooked on the other side unless considerable pains are taken to turn the article of food manually from time to time. Manual turning of the food article is not althogether satisfactory because it is not always possible to expose the entire periphery of the food to the fire for the same period of time and, consequently, the food article is not always cooked evenly.

Various kinds of spits have been proposed for overcoming the aforementioned problem and such constructions most commonly include a plurality of sharply pointed elements adapted to pierce the food article in a number of places spaced from the axis of the spit so as to preclude relative rotation between the spit and the article of food. Constructions of this kind, however, are not altogether satisfactory inasmuch as the piercing of an article such as a roast in a plurality of places permits the escape of juices and prevents the food article from being as tasty as it otherwise might be. Furthermore, it frequently is difficult to remove the spit from the cooked article of food without handling the food, a practice which not only is objectionable from the sanitation standpoint but may even result in severely burning the cook.

An object of the present invention is to provide an improved spit construction adapted to support an article of food adjacent to an open fire or the like and which is so constructed as to preclude relative rotation between the spit and the article supported thereby.

Another object of the invention is to provide a spit adapted to impale an article of food and which is capable of compensating for any enlargement of the opening surrounding the spit during the cooking of the article of food.

A further object of the invention is to provide a spit of the type referred to in which an article to be cooked need be pierced only in the zone where the spit is to be accommodated.

Still a further object of the invention is to provide an article of food especially adapted for cooking over an open fire or the like and which is provided prior to delivery to the consumer with a spit-accommodating opening therethrough and with spit-receiving means of such construction as to preclude relative rotation between the food article and the supporting spit.

A still further object of the invention is to provide a spit construction which is capable of being removed from a cooked food article without requiring handling of the food.

Other objects and advantages of the invention will be pointed out in detail or will become apparent from the following description when it is considered in conjunction with the appended claims and the accompanying drawings, in which:

FIGURE 1 is a fragmentary view, partly in side elevation and partly in section, of a spit constructed in accordance with one embodiment of the invention and supporting an article of food also formed in accordance with the invention;

FIGURE 2 is an enlarged, fragmentary, sectional view of a portion of the spit shown in FIGURE 1;

FIGURE 3 is a fragmentary, bottom plan view of a portion of the structure shown in FIGURE 2;

FIGURE 4 is a sectional view taken on the line 4—4 of FIGURE 2;

FIGURE 5 is a fragmentary view generally similar to FIGURE 1, but showing the spit in adjusted condition;

FIGURE 6 is a sectional view taken on the line 6—6 of FIGURE 5;

FIGURE 7 is a sectional view taken on the line 7—7 of FIGURE 1;

FIGURE 8 is an enlarged, sectional view taken on the line 8—8 of FIGURE 1;

FIGURE 9 is an enlarged, end view looking in the direction of the arrows 9—9 in FIGURE 1;

FIGURE 10 is a view similar to FIGURE 5, but disclosing another embodiment of the invention;

FIGURE 11 is an enlarged view similar to FIGURE 2 and disclosing the modified spit in adjusted position;

FIGURE 12 is a fragmentary, bottom plan view of the spit shown in FIGURES 10 and 11; and FIGURES 13, 14 and 15 are sectional views taken along the lines 13—13, 14—14, and 15—15, respectively.

A spit constructed in accordance with the embodiment of the invention disclosed in FIGURES 1-9 is represented generally by the reference character 1 and comprises a mounting rod or member 2 having secured at one of its ends, by suitable means such as welding, one end of an elongate supporting section 3 which, as is best shown in FIGURES 2 and 6, may present in section the appearance of one half of a split tube. The other end of the section 3 has welded or otherwise suitably secured thereto one end of a skewer 4 which terminates at its other end in a pointed section or tip 5 adapted to facilitate the insertion of the spit in an article to be supported thereby.

At intervals along the length of the supporting section 3 are links 6, each of which is pivotally supported at one end on a pivot pin 7 carried by the supporting section 3. The other end of each of the links 6 is pivotally mounted by means of a pin 8 on a supporting section 9 similar to the section 3. The length of each link 6 is the same so that the supporting sections 3 and 9 will be substantially parallel to one another in all positions of adjustment. The two extreme positions of adjustment of the supporting sections 3 and 9 are indicated in FIGURES 1 and 5, FIGURE 1 illustrating the relative positions of the sections when the links 6 have been rocked as far as possible in a direction counterclockwise about the axes of the pins 7, and FIGURE 5 illustrating the relative positions of the supporting sections when the links 6 have been rocked as far as possible in the opposite direction. To enable the links 6 to rock freely without interference from the supporting sections 3 and 9, the ends of the links are rounded as is indicated at 10.

One end of the supporting element 9 has welded or otherwise suitably secured thereto a pointed extension 11 adapted to nest with the extension 4 when the elements 3 and 9 are arranged as is shown in FIGURE 5 so as to facilitate insertion of the spit in an article of food. The other end of the element 9 has welded or otherwise suitably secured thereto a collar device 12 which encircles both of the supporting elements 3 and 9 and which is of such size as to permit swinging movement of the links 6 to the positions shown in FIGURES 1 and 2, but prevents the links from being swung about the axes of the pins 7 to such positions that the pins 7 and 8 may be in vertical alignment. If desired, a stop or post 12a may be provided on the support 3 in a position to be engaged by the collar 12 when the sections 3 and 9 are in their remote positions of adjustment. The collar device 12 is provided with an inclined or cam surface 13 along its rear edge for a purpose to be pointed out hereinafter.

The construction and arrangement of the parts described thus far are such that the food-supporting elements 3 and 9 are freely adjustable from a contracted position, such as is shown in FIGURE 5, to an expanded position, such as is shown in FIGURES 1 and 2. Apparatus constructed in accordance with the invention preferably includes means for effecting relative movement of the food supporting elements 3 and 9 and, in the embodiment disclosed in FIGURES 1–9, such means comprises a cam device 15 mounted on the supporting rod 2 for sliding movements towards and away from the collar 12. The forward face of the cam device 15 is provided with an inclined or cam surface 16 which complements the cam surface 13 on the collar 12. The slideable cam device 15 is maintained in proper angular position on the rod 2 by a pin 17 which extends through the device 15 and projects into a groove 18 formed in the rod 2 and extending longitudinally of the latter. The cam 15 is adapted to bear against the collar device 12 in such manner as to force the sections 3 and 9 to move apart. This characteristic of the invention will be described more fully hereinafter.

The free end of the mounting rod 2 is threaded as at 19 for reception of an operating handle 20 having a bore correspondingly threaded so as to enable the handle to be rotated relatively to the rod 2 and moved fore and aft of the latter. The handle 20 is counterbored as at 21 to provide a chamber 22 terminating inwardly of the handle in the base 23. A yieldable, force transmitting spring 24 surrounds the rod 2 and is received within the chamber 22 so that one end of the spring bears against the base 23 of the chamber. The other end of the spring is adapted to bear against a slide element 25 which is mounted on the rod 2 for sliding movements fore and aft, the slide element 25 being guided in its movements by a pin 26 extending through the element 25 and projecting into the groove 18.

Motion transmitting means is interposed between the slide element 25 and the cam device 15 so as to transmit to the latter movement of the slide 25. In the embodiment of the invention shown in FIGURES 1–9, the motion transmitting means comprises a rod 27 received in the groove 18 and being of such length as to span the distance between the pins 17 and 26 in the cam device 15 and the slide element 25, respectively. The rod 27 may be maintained in the groove 18 in any one of a number of ways. For example, the groove 18 and the rod 27 may be dovetailed. In the disclosed embodiment of the invention, however, the rod 27 is maintained in the groove 18 by a pinion gear or sprocket wheel 28 having a hub 29 surrounding the mounting rod 2 and being fixed in position on the latter by means of a set screw 30. The gear hub 29 will not prevent sliding movements of the rod 27, but will prevent the latter from falling out of the groove 18.

To condition the apparatus thus far described for use, the operating handle 20 is rotated on the mounting rod 2 so as to cause the handle 20 to move away from the supporting sections 3 and 9, or to the left as is viewed in FIGURES 1 and 3. Movement of the handle part 20 in a direction away from the supporting parts 3 and 9 will permit the spring 24 and the slide 25 to move in the same direction, thereby enabling the rod 27 and the cam 15 to move away from the collar 12. The latter may be moved to the left a distance sufficient to permit the sections 3 and 9 to be located closely adjacent to one another as is shown in FIGURE 5. With the parts located in the positions shown in FIGURE 5, the pointed end 5 of the spit may be forced through an article of food such as a roast so as to locate the latter intermediate the ends of the supporting sections 3 and 9. Thereafter, the handle part 20 may be rotated in such a direction as to cause it to move towards the supporting sections 3 and 9, thereby causing the spring 24 to exert a force on the slideable element 25 tending to move the latter towards the cam device 15. The force exerted on the slide element 25 is transmitted via the rod 27 to the cam device 15 so as to cause the latter to bear against the cam surface 13 on the collar or cam follower 12, tending to cause the supporting elements 3 and 9 to separate, that is, move away from one another. The supporting elements 3 and 9 are prevented from moving away from each other, however, because of the engagement of the elements with the meat or other article mounted thereon. As a result, the spring 24 is compressed between the slide element 25 and the base 23 of the chamber 22.

When an article of food has been spitted in the manner indicated, it may be suspended adjacent to a charcoal or gas grill (not shown) provided with side panels 31 having notches 32 therein adapted to receive and support opposite ends of the spit 1. A gear or sprocket chain driving assembly (not shown) may be associated with the grill and mesh with the gear 28 so as to cause the spit and the food article supported thereon to be rotated adjacent to the fire.

As the food is cooked, any tendency of the spit-accommodating opening to enlarge is compensated for by the reaction of the compressed spring 24 on the spit elements 3 and 9 tending to separate them. Consequently, the supporting sections 3 and 9 constantly are spring pressed snugly against the food article supported thereon so as to preclude relative rotation between the article of food and the spit.

In order to facilitate the supporting of certain cuts of meat or poultry on the spit 1 it is preferred that they be provided with a pre-formed opening therein of such size as freely to accommodate the spit. Such an arrangement is illustrated in FIGURE 1 wherein a rolled roast 33, for example, is pre-formed with a longitudinally extending opening 34 therethrough. Preferably, the opening 34 should be generally elliptical in form. An elliptical opening may be assured by inserting in the opening 34 a metal or heat-resistant plastic tube 35 having a generally elliptical configuration, in cross section, and being of such size as readily to accommodate the spit-supporting sections 3 and 9. It is anticipated that meat and poultry suppliers for commercial establishments such as restaurants will supply frozen food articles including the pre-formed opening 34 and the tube 35.

When a food article provided with a preformed opening or tube is to be roasted, the spit may be inserted in the opening or tube and the handle part 20 rotated as previously explained so as to expand the supporting sections of the spit into snug engagement with the walls of the opening or tube. When the article of food has been cooked, the handle 20 may be rotated in a direction to cause it to move away from the cam device 15 in the manner previously described, thereby permitting the sections 3 and 9 to move towards one another by gravity and enable the spit to be withdrawn without necessitating handling of the food.

The embodiment of the invention disclosed in FIG-

URES 10-15 is generally similar to the previously described embodiment and parts common to both forms of the invention are identified by the same reference characters. The principal difference between the two embodiments is that the construction shown in FIGURES 10-15 has been somewhat simplified. In the modified embodiment, the cam device 15, the slide 25, the rod 27, and their associated parts have been replaced by a sleeve member 35 which performs all the functions of the parts it replaces and, thus, may be considered a combined cam device and motion transmitting means.

The sleeve 35 includes a body portion 36 which is slideably received on the support 2 in a position between the spring 24 and the cam follower 12. The leading end 37 of the sleeve body is beveled or shaped to complement the cam surface 13 of the device 12 and the other end of the body 36 may be equipped with a flange 38 adapted to serve as a seat against which the spring 24 may bear.

The operation of the spit disclosed in FIGURES 10-15 is exactly the same as that of the previously described embodiment in that the spring 24, when compressed, is capable of exerting a force on the sleeve 35 which it transmits to the cam follower 12 and urges the latter in a direction such that the spit sections 3 and 9 tend to move away from one another, that is, the sections tend to move from the positions shown in FIGURE 10 to the positions shown in FIGURE 11.

The construction shown in FIGURES 10-15 is adapted to be driven directly from a motor (not shown) having a driving shaft fitted with a socket adapted to receive one or the other end of the spit. To enable the spit to be used with a motor of this kind, the tip of the spit section 4 is provided with a flattened surface 4a adapted to be received in the correspondingly shaped motor driven socket so as to permit the spit to be rotated. In order that the spit may be used with all of the motor driving devices currently on the market, the free end of the supporting rod 2 also may be provided with a similar flattened surface 2a.

A spit adapted to be driven directly from a driving motor need not be equipped with a gear or sprocket such as is shown in FIGURES 1-9. It may, however, be necessary to fix the spit between the grille panels 31 against movement longitudinally of its axis. For this purpose, the sleeve body 36 carries a collar 39 which is shiftable longitudinally of the sleeve and which may be fixed in a selected position of adjustment on the rod 2 by means of a set screw 40 which is adapted to extend through a slot 41 cut through a wall of the sleeve.

It will be understood that the gear 28 shown in the first embodiment may be substituted for the collar 39, and vice versa, depending on the kind of driving mechanism used to rotate the spit.

The disclosed embodiments are representative of presently preferred forms of the invention, but are intended to be illustrative rather than definitive thereof. The invention is defined in the claims.

I claim:
1. A barbecue spit construction comprising a first rigid rod member; a second and longer rigid rod member arranged parallel to said first rod member with a portion of said second rod member extending beyond one end of said first rod member; means pivotally linking said first and second rod members to one another for movement of said first rod member from a first position in which it is in side-by-side engagement over its full length with said second rod member, to a second position in which said rod members are parallel but spaced apart from one another; operating means mounted on said portion of said second rod member for movements relative thereto toward and away from said first rod member; and yieldable force transmitting means including spring means supported by said portion of said second rod member interposed between and reacting on said operating means and said first rod member for exerting a yieldable force on said first rod member tending to move the latter to said second position in response to movement of said operating member toward said first rod member.

2. A barbecue spit construction comprising a first rigid rod member; a second and longer rigid rod member arranged parallel to said first rod member with a portion of said second rod member extending beyond one end of said first rod member; means pivotally linking said first and second rod members to one another for movement of said first rod member from a first position in which it is in side-by-side engagement over its full length with said second rod member, to a second position in which said rod members are parallel but spaced apart from one another; operating means mounted on said portion of said second rod member for movements relative thereto toward and away from said first rod member; motion transmitting means movably mounted on said portion of said second rod member for engagement with said first rod member; and spring means supported by said portion of said second rod member interposed between and reacting on said operating means and said motion transmitting means for yieldably urging the latter into engagement with said first rod member and tending to move said first rod member to said second position in response to movement of said operating member toward said first rod member.

3. A barbecue spit construction comprising a first rigid rod member; a second and longer rigid rod member arranged parallel to said first rod member with a portion of said second rod member extending beyond one end of said first rod member, said first rod member having a cam surface at said one end thereof; means pivotally linking said first and second rod members to one another for movement of said first rod member from a first position in which it is in side-by-side engagement over its full length with said second rod member, to a second position in which said rod members are parallel but spaced apart from one another; operating means mounted on said portion of said second rod member for movements relative thereto toward and away from said first rod member; motion transmitting means movably mounted on said portion of said second rod member for engagement with said cam surface; and spring means supported by said portion of said second rod member interposed between and reacting on said operating means and said motion transmitting means for yieldably urging the latter into engagement with said cam surface and tending to move said first rod member to said second position in response to movement of said operating member toward said first rod member.

4. A barbecue spit construction comprising a first rigid rod member; a second and longer rigid rod member arranged parallel to said first rod member with a portion of said second rod member extending beyond one end of said first rod member, said first rod member having a cam surface at said one end thereof; means pivotally linking said first and second rod members to one another for movement of said first rod member from a first position in which it is in side-by-side engagement over its full length with said second rod member, to a second position in which said rod members are parallel but spaced apart from one another; operating means mounted on said portion of said second rod member for movements relative thereto toward and away from said first rod member; motion transmitting means movably mounted on said portion of said second rod member for engagement with said cam surface, said motion transmitting means comprising a slide member having a cam surface engageable with said cam surface on said first rod member; and spring means supported by said portion of said second rod member interposed between and reacting on said operating means and said motion transmitting means for yieldably urging the latter into engagement with said cam surface and tending to move said first rod member to said second position in response to movement of said operating member toward said first rod member.

References Cited in the file of this patent

UNITED STATES PATENTS

| | | |
|---|---|---|
| 136,751 | Nevill | Mar. 11, 1873 |
| 183,293 | Freese | Oct. 17, 1876 |
| 445,296 | Adams | Jan. 27, 1891 |
| 935,379 | Long | Sept. 28, 1909 |
| 1,046,474 | Marcuse | Dec. 10, 1912 |
| 1,093,284 | Mehlum | Apr. 14, 1914 |
| 1,359,649 | Allison | Nov. 23, 1920 |
| 1,876,279 | Dietrich | Sept. 6, 1932 |
| 1,890,907 | Hoover | Dec. 13, 1932 |
| 2,192,358 | Lieber | Mar. 5, 1940 |
| 2,198,421 | Wise | Apr. 23, 1940 |
| 2,443,243 | Hayssen | June 15, 1948 |
| 2,811,099 | McGoldrick | Oct. 29, 1957 |
| 2,838,990 | Stiburski | June 17, 1958 |